United States Patent [19]

Tipton

[11] Patent Number: 5,361,882

[45] Date of Patent: Nov. 8, 1994

[54] MULTI-STAGE CLUTCH LOCK-UP SYSTEM

[76] Inventor: Kenneth L. Tipton, 1031 Fairlawn, Rockledge, Fla. 32955

[21] Appl. No.: 58,885

[22] Filed: May 10, 1993

[51] Int. Cl.⁵ .................. F16D 13/42; F16D 43/12
[52] U.S. Cl. .................. 192/70.24; 192/82 P; 192/83; 192/105 C
[58] Field of Search ............. 192/70.24, 70.26, 82 P, 192/83, 103 A, 105 C; 180/230

[56] References Cited

U.S. PATENT DOCUMENTS

| 1,035,535 | 8/1912 | Coleman | 192/105 C |
| 1,743,170 | 1/1930 | Vail | 192/105 C |
| 4,111,291 | 9/1978 | Horstman | 192/105 C |
| 4,566,577 | 1/1986 | Tsuboi | 192/85 CA |
| 4,732,251 | 3/1988 | Tipton | 192/70.24 |
| 4,856,637 | 8/1989 | Gebhart | 192/105 C |
| 4,986,403 | 1/1991 | Tipton | 192/70.11 |
| 4,989,711 | 2/1991 | Schultz et al. | 192/105 F |
| 5,033,598 | 7/1991 | Tipton | 192/70.24 |

FOREIGN PATENT DOCUMENTS

| 3430376 | 3/1985 | Germany | 192/82 P |
| 58-137628 | 8/1983 | Japan | 192/82 P |
| 59-200814 | 11/1984 | Japan | 192/82 P |

Primary Examiner—Richard M. Lorence
Attorney, Agent, or Firm—Gordon K. Anderson

[57] ABSTRACT

A combined mechanical and centrifugal clutch for a motor driven vehicle which has several original equipment manufacturer's components including an inside and an outside pressure plate (70), also frictional material for transmitting torque through the clutch. A lock-up housing (84) is attached to the outside pressure plate and contains a number of pivotally connected camming fingers (100) that force the outside pressure plate into tensional contact wit the frictional material by the camming force of the fingers caused by rotational centrifugal force. The operational portion of the mechanical clutch is unaltered permitting mechanical release of the clutch with the centrifugal portion added to lock-in the torque transmitting capabilities permitting increased capacity and positive engagement. Selecting the optimum rotational engagement speed is achieved by the use of weights and altering the springs or changing spring compressibility.

12 Claims, 3 Drawing Sheets

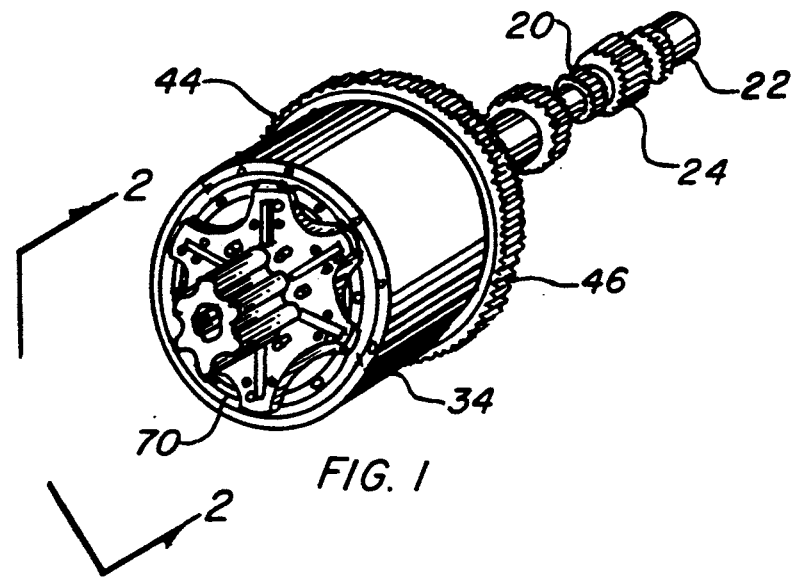
FIG. 1
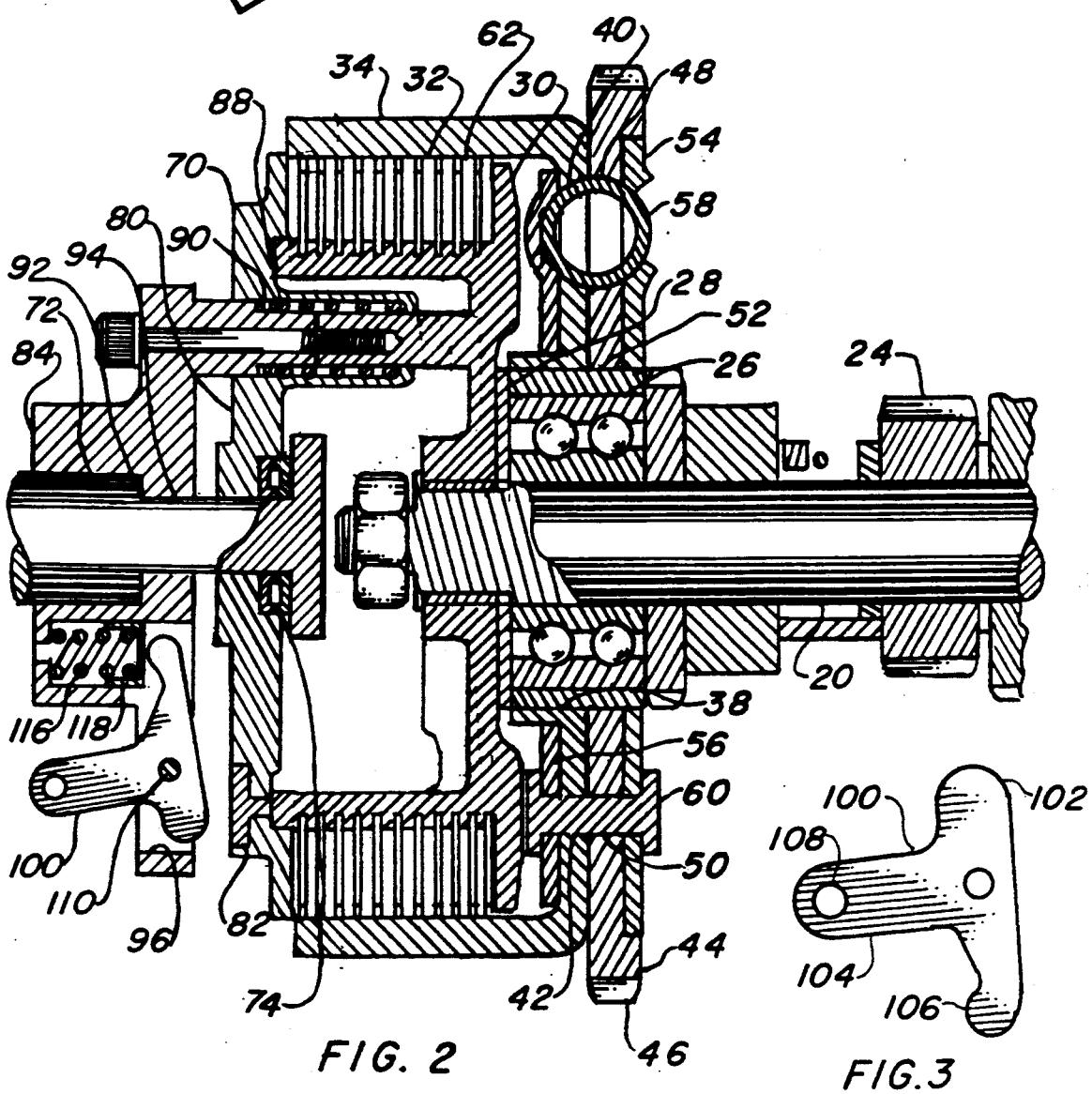
FIG. 2
FIG. 3

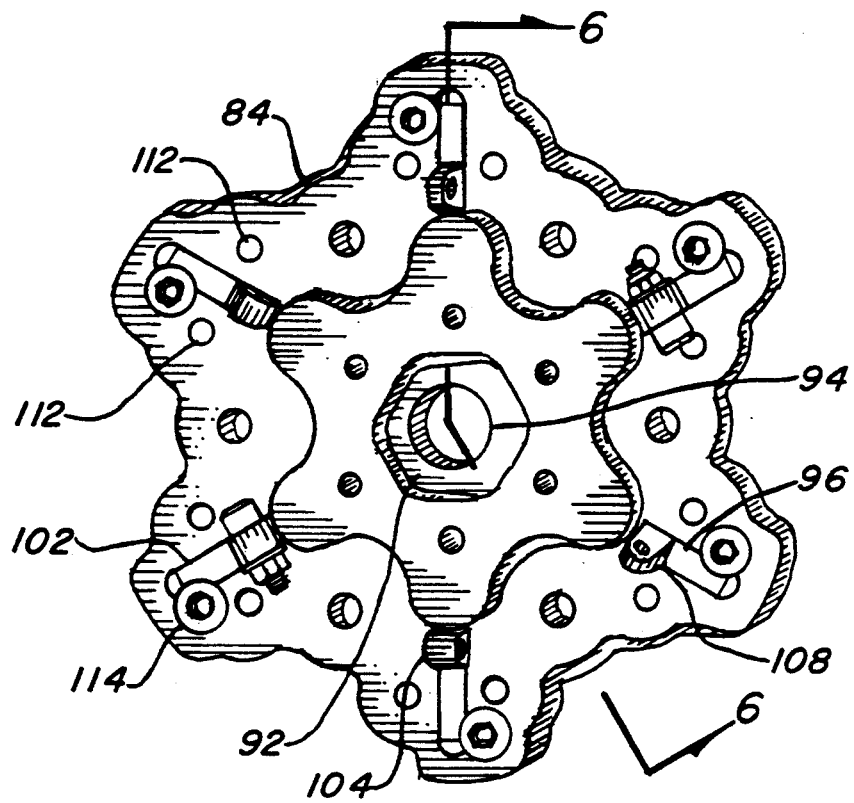
FIG. 5
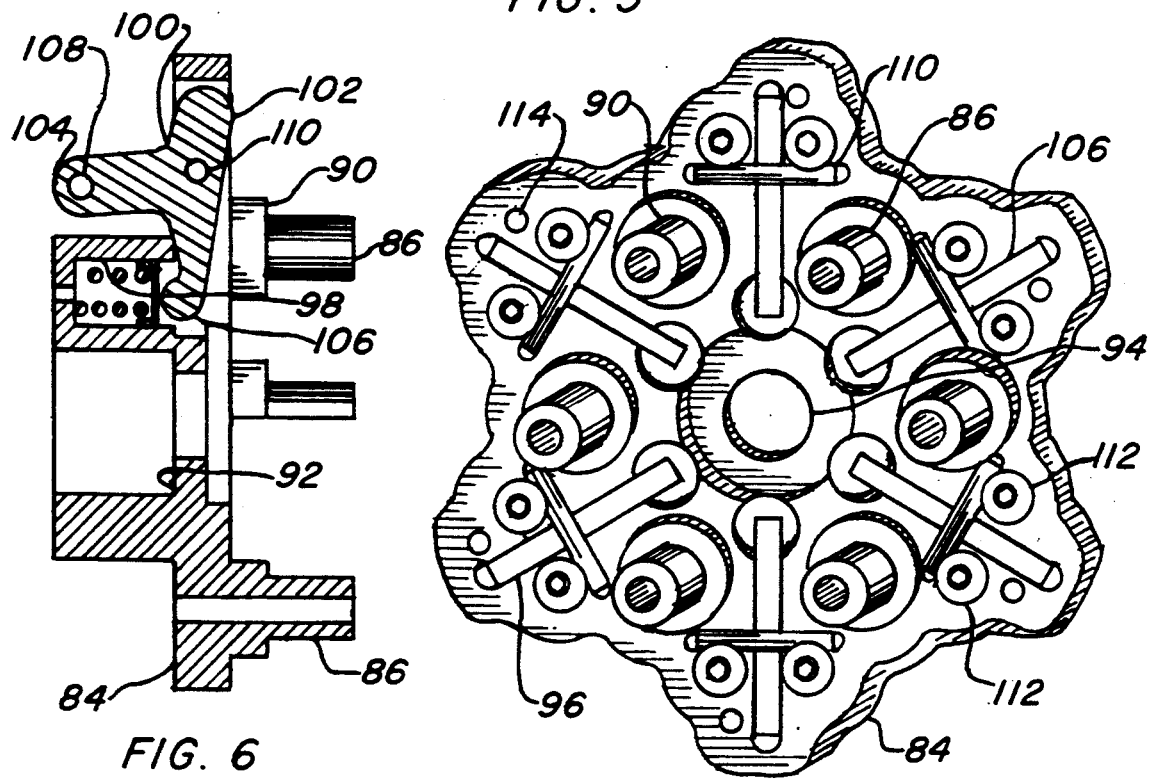
FIG. 6
FIG. 7

1

MULTI-STAGE CLUTCH LOCK-UP SYSTEM

TECHNICAL FIELD

The present invention relates to clutches in general, more specifically to an improvement in original equipment manufacturer's clutches adding a centrifugally actuated lock-up system utilizing multi-stage adjustments for timed track racing environments.

BACKGROUND ART

In the sport of drag racing motor vehicles, centrifugal clutches have dominated motorcycles and specialized mechanical clutches are normally employed in dragsters. Developments to improve either type of clutch have been continually pursued in the industry and adaption is made very rapidly to eliminate any competitive advantage. Conventional clutches normally utilized in motorcycles are operated manually by a lever mounted on the handlebar with cable and rack and pinion operator. The coordination of increasing speed with the accelerator and releasing the clutch at the appropriate engine rotational speed has proven by itself to be ineffective and somewhat erratic. Centrifugal clutches have dominated the field due to their superiority in regulated speed engagement and slip control. Dry types of clutches have been tried in the past using materials with a high coefficient of friction specifically for this purpose, however, extensive modification to the vehicle, particularly a motorcycle, makes this approach expensive and time consuming.

A search of the prior art did not disclose any patents that read directly on the claims of the instant invention, however, the following U.S. patents are considered related:

| U.S. PAT. NO. | INVENTOR | ISSUE DATE |
| --- | --- | --- |
| 5,033,598 | Tipton | Jul. 23, 1991 |
| 4,989,711 | Schultz et al | Feb. 5, 1991 |
| 4,986,403 | Tipton | Jan. 22, 1991 |
| 4,856,637 | Gebhart | Aug. 15, 1989 |
| 4,732,251 | Tipton | Mar. 22, 1988 |
| 4,566,577 | Tsuboi | Jan. 28, 1986 |
| 4,111,291 | Horstman | Sep. 5, 1976 |
| 1,743,170 | Vail | Jan. 14, 1930 |
| 1,035,535 | Coleman | Aug. 13, 1912 |

Tipton in patent '598, issued to the present inventor, teaches an improvement in motorcycle slider clutches that utilizes several original equipment manufacturer's components and an aftermarket basket assembly. An enclosure surrounds the basket and fingers operated centrifugally that compress the clutch discs and plates in the first stage of operation. The second stage is electrically timed in sequence utilizing pressurized fluid to control the action of the cammed fingers in a positive actuating mode of operation.

Schultz et al, patent '711, discloses a controller for a centrifugal clutch with weighted arms. The controller has a fluid actuated cylinder and piston engaging a throw out bearing. The controller is pre-programmed to restrain pivoting the arms and weights to slow and control the rate of increase of actuating pressure in the clutch.

Tipton's patent '403, issued to the present inventor, is for a motorcycle slider clutch that utilizes a pair of pneumatic cylinders and pistons to restrain the movement of centrifugally actuated fingers creating multi-stage control. Solenoid valves and timers allow a timed starting sequence with the centrifugal slider clutch utilizing a number of original equipment manufacturer's components and aftermarket modifications.

Gebhart, in patent '637, teaches a centrifugal clutch with a frusto-conical friction surface with drum and levers adapted to bias the conical surface at a predetermined speed of rotation. Stall speed screws adjust the speed of rotation for engagement and drive torque is transmitted by a sprocket attached to the pressure drum. The shape of the pressure plate creates an increased mechanical advantage permitting a reduced physical size.

Patent '251, also issued to the present inventor, utilizes a portion of the original equipment manufacturer's components, however, it is directed to an entirely centrifugal actuated clutch using new elements to change over from the mechanical type. Fingers and a pressure plate are added to force the plate into contact with the original discs and plates making a union between the rotating elements due to the centrifugal force applied by the fingers. The clutch is wet being oil lubricated in the same manner as originally designed by the manufacturer.

Tsuboi, in '577, discloses a clutch release device for motorcycles using a manual actuated hydraulic system in which a push rod is arranged to extend through the main shaft with a pressure plate on each end. One end is arranged to interface with a hydraulic cylinder and the other with the clutch disc pressure plate. It is noted, however, that no centrifugal action is used by this invention and it is assigned to the motorcycle original equipment manufacturer.

Horstman, in '291, teaches a centrifugal clutch for go-carts and employs weights or stampings that pivot against a plate compressing discs together for engagement, depending upon rotational speed.

Vail, in '170, uses centrifugal weights forcing separable plates together against adjustable spring pressure, further allowing manually operated means to relieve the pressure on the weights forcing them into an inoperable position allowing shifting of gears.

For background purposes and as indicative of the art to which the invention relates reference may be made to the patent issued to Coleman.

DISCLOSURE OF THE INVENTION

In the so-called drag racing sport, the ability to leave the line without over rotating the tires and loosing friction and yet transmit the greatest amount of torque from the engine to obtain the maximum speed, is the goal and is of the utmost importance. In the past, the centrifugal or slider clutch has proven to be the most successful in producing this effect, at least in the motorcycle racing discipline. When utilizing greater horsepower, a mechanical clutch, while having some basic advantages, such as the initial soft release, is limited by the amount of power it can transmit as the springs that force the frictional material against the flat load bearing surface must have sufficient compressive strength to maintain the union and yet be resilient enough to be compressed for disengagement.

It is, therefore, a primary object of the invention to utilize an original equipment manufacturer's mechanical clutch in concert with an aftermarket centrifugal clutch lock-up mechanism that achieves the best advantage of the functional utility of each device. With this combination the ultimate torque transmitted may be increased immensely as the mechanical actuator creates a soft release and, as the torque increases, along with the rotational speed, the centrifugal action locks-up the clutch precluding any slippage, even at horsepowers and torque well beyond the capability of the mechanical clutch by itself.

Further, an important object of the invention is directed to the ability of the clutch to be physically located completely within the vehicle, specifically the motorcycle case requiring no basic modification to the structure or inherent changes in the lubrication system. This is accomplished by the use of the same friction clutch plates and metal interceding plates, as furnished in the original manufacture of the vehicle, also the same output shaft with its corresponding driver gear cluster. The invention, at least in a motorcycle using the same clutch plates, fits within the existing package and is completely balanced as it operates between a pair of lubricated bearings. The addition of a spacer or replacement of the cover is necessary in order to allow sufficient room for actuation, however, this requires no actual modification to the gear case, only replacement of a housing cover component. As an example, a SUZUKI motorcycle requires only a spacer, while a KAWASAKI requires a new housing cover. Since the clutch itself has not been basically altered, likewise the lubrication system of a motorcycle requires no modification at all. The oil pump has sufficient capacity to supply the necessary lubricating oil to the clutch and bearings through the present galleries and sump, while the friction plates are already designed for the actual environment.

Another object of the invention is the ability of the invention to be completely adjustable over the entire range of operational speeds from 1500 revolutions per minute (RPM) to 9000 RPM, precluding slippage and any speed and gear ratio. The mechanical clutch may be adjusted by varying the resilience of the release springs by adding washer-like spacers or actually replacing the springs using different wire diameter or material. The camming finger compression springs on the centrifugal lock-up portion may be varied in a like manner and the addition of weights to the counterbalance arm of the camming fingers adds compressive pressure at predetermined rotational speeds.

Still another object of the invention is the adaptability to any motor driven vehicle. While the application to a motorcycle has been presented thus far, as its modification is simple, any mechanical clutch may be altered to include this centrifugal lock-up portion. The utility, therefore, includes automobiles, trucks, tractors, dragsters, etc. In the art of drag racing, other than stock cars, there is no standard engine clutch developed specifically by the engine manufacturer, instead each different dragster and classification requires a distinctive device produced by a number of separate manufacturer's. Even with this disparity, the principle of using a spline and fibrous frictional material, or a metallic substance including sintered metal, attached in some manner to the driveshaft remains consistent. Therefore, the principle of using a centrifugal lock-up device in conjunction with the mechanical clutch in any motor vehicle is well within the scope of this invention. The basic premise of this type of mechanical clutch embodies an inside and outside pressure plate of some type that when released, compresses specially selected materials together in a slipping manner to transmit torque, therefore, the addition of the centrifugal lock-up device is indeed unique and novel in this combination and opens up broad fields of utility in this discipline.

BRIEF DESCRIPTION OF THE DRAWINGS

FIG. 1 is a partial isometric view of the preferred embodiment shown completely assembled, less housing cover and bearing, including the shaft and gears that have been removed from the motorcycle and assembled into the invention.

FIG. 2 is a cross-sectional view taken along lines 2—2 of FIG. 1 shown in the disengaged position.

FIG. 3 is an elevational view of one of the camming fingers completely removed from the invention for clarity.

FIG. 5 is a partial isometric view of the front lock-up housing completely removed from the invention for clarity.

FIG. 6 is a cross-sectional view taken along lines 6—6 of FIG. 5.

FIG. 7 is a partial isometric rear view of the lock-up housing completely removed from the invention for clarity.

BEST MODE FOR CARRYING OUT THE INVENTION

Figure 4:
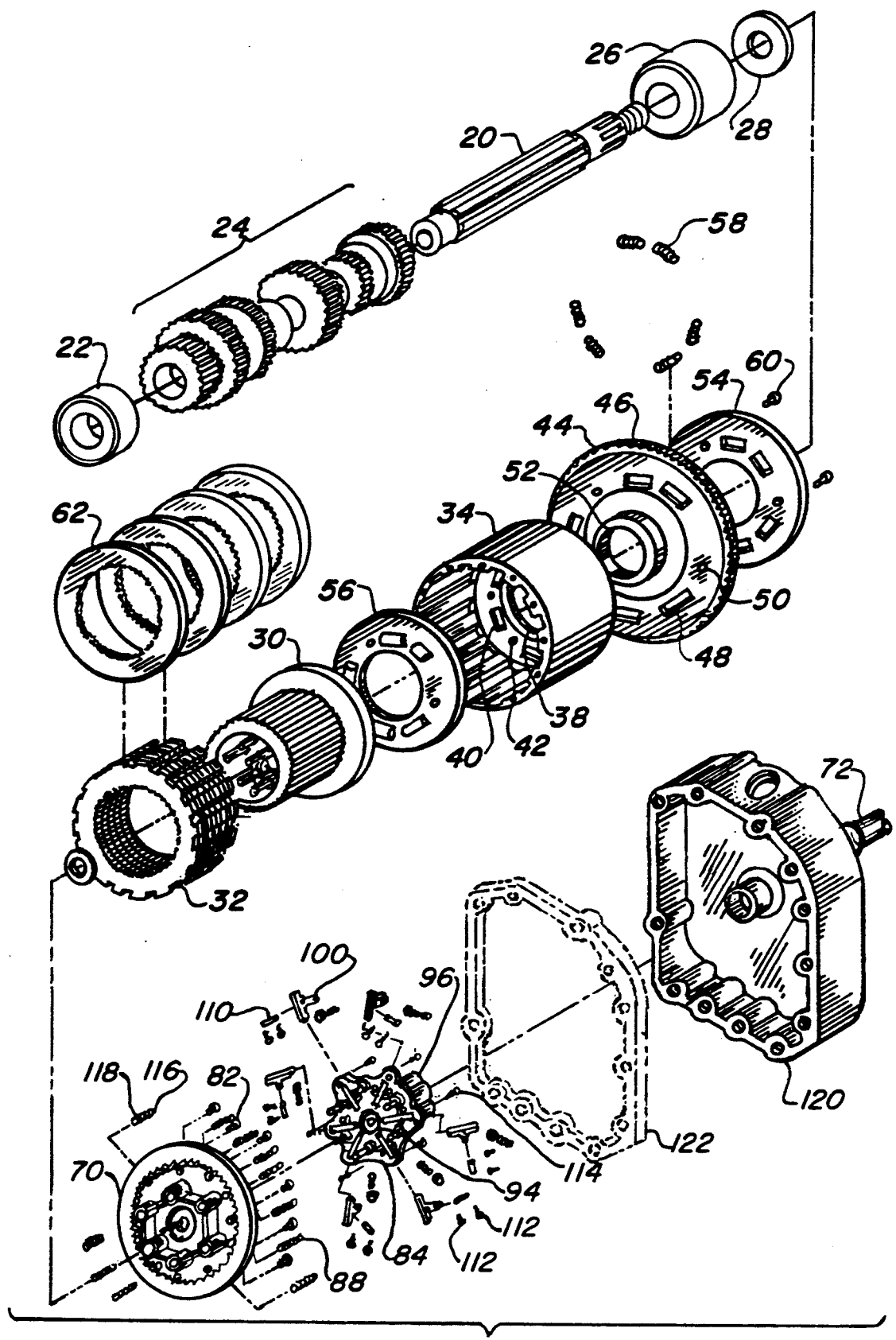
FIG. 4 is an exploded view of the entire clutch with the elements utilized from the original equipment manufacturer shown in light lines without shading.

The best mode for carrying out the invention is presented for a motorcycle in terms of a preferred embodiment. This preferred embodiment, as shown in FIGS. 1 through 7, is comprised of the following components utilized by the original equipment manufacture on the same motorcycle that the clutch is intended for. These include a transmission output shaft 20, including a front bearing 22, the entire transmission gear cluster 24 with all necessary gears, jaws, bearings and springs, the main bearing assembly 26 including the thrust washer 28, the center hub and a plurality of alternately nested clutch friction disks and clutch pressure plates 32.

Further, elements that make-up the invention consist of a basket 34 that is in cylindrical shape with one end open and the other end closed. The outside of the basket is smooth with the inside containing a plurality of grooves that are the same approximate size as the peripheral teeth on the friction disks 32. The open end is large enough to receive the disks 32 and the closed end contains a centrally located bearing opening 38 and a series of spring slots 40 and rivet holes 42.

A spring loaded housing gear assembly 44 is resiliently attached to the slider basket 34 flexibly transferring the torque from the gear to the basket. This gear assembly 44 contains a housing gear 46 that includes a ring gear on the periphery and a series of spring retaining slots 48 and clearance holes 50 with a bearing receiving opening 52 in the center of a web. An outside backing plate 54, having a plurality of spring retaining radially formed apertures upset from the plate and rivet holes, is placed on one side of the gear 46 and the basket 34 on the other. An inside backing plate 56 having matching spring cavities and rivet holes is positioned directly inside the basket 34 closed end. A plurality of springs 58 are captivated within the slots 40 and 48 in the basket 34 and gear 46 on one side, also the upset apertures of the outside backing plate 54 and the cavities of the inside backing plate 56 on the other. A plurality of rivets 60 penetrate through the mating holes 42 and 50, including those in the backing plates 54 and 56, and join the four elements together with a permanent head on one end of the rivet and a bucked head on the other. This assembly of parts allows movement therebetween defining a torque and shock absorbing association.

The main bearing assembly 26 is installed in the bearing opening 38 of the basket 34 that forms a rotational bearing receptacle and the shaft 20 is slid into the inner race of the bearing 26. The front bearing 22 and transmission gear cluster 24 are on one end and a center hub 30 is mounted with a hex nut and washer on the other, with the basket 34 and housing gear assembly 44 inbetween. The motorcycle clutch friction disks and clutch pressure plates 32 are inserted between the basket 34 and the center hub 30. The outwardly extending teeth of the friction disks 32 mate with the inside grooves in the basket 34 and the center hub 30 contains similar grooves, but on the outside diameter that mates with extending teeth on the clutch pressure plates 32. The disks and plates 32 are stacked together filling the void within the basket 34 allowing free rotation therebetween until compressed.

The stack of disks and plates 32, as furnished by the original equipment manufacturer, are deemed acceptable to use in many applications and types of motorcycle racing, however, as horsepower requirements for the clutch increase, there is a point at which the original components are inadequate, therefore, hard chrome pressure plates 62 are added or replace those plates 32 within the stack. The plates 62 preferably receive a flash chrome coating of from 3 to 5 ten thousandths of an inch and ultimately make shifting smoother and achieve more consistent repeatability, as well as increase the torsional load transmitting capabilities of the clutch. A further advantage of their use assists in eliminating hot spots and warpage. While two or three hard chrome plates 62 may be adequate in some instances, all of the plates 62 may be replaced in the higher load carrying applications for optimum functional capability. For convenience, the element reference numbers 20-62 are the same as the inventors previous U.S. Pat. Nos. 4,732,251, 4,986,403 and 5,033,598.

The components of the mechanical clutch furnished by the original equipment manufacturer, but not part of the inventors previously used centrifugal clutch improvements, include a spring loaded outside pressure plate 70 and a rack and pinion shaft 72 with needle bearing 74 that mechanically actuates the clutch by a release mechanism normally pulled manually by a cable and lever attached to a motorcycle handlebar, The shaft 72 is illustrated in part, in FIGS. 2 and 4, and is shown only fragmentarily as its configuration is not specifically germane to the invention and various types of rack and pinion actuation are used by different original equipment manufacturer's. It should also be understood that the clutch thus illustrated is for a specific manufacturer, i.e. SUZUKI and should not be limited to this embodiment shown, as differences exist when produced by other manufacturer's. KAWASAKI, as an example, actuates their clutch with a hydraulic release that utilizes a rod running continuously through the transmission output shaft 20 and pushes the pressure plate 70 outwardly away from the contiguous disks and plates. In some instances it is necessary to machine a flat surface 80 on the side of the outside pressure plate 70 that is opposite and contiguous with the friction disk and pressure plates 32 permitting positioning of the centrifugal lock-up portion of the invention. Further, a number of hardened steel wear pads 82 may be embedded into this machined flat surface 80 for creating an interface having minimum wear potential as the pressure plate 80 is normally made of aluminum. These pads 82 increase operating life of the clutch and ensure repeatable operational sequence as the moving parts of the lock-up portion cams into the plate at that specific location.

A lock-up housing 84 is compressibly and resiliently attached to the outside pressure plate 70 and has a number of hollow spring guide sleeves 86 that extend outwardly and retain a like number of original equipment manufacturer's compression springs 88 utilized to spring load the pressure plate 70 to the center hub 30. Each spring guide sleeve 86 further contains a spring depressing shoulder 90 integral with each sleeve that contiguously compress the outside pressure plate springs 88.

The lock-up housing 84 further contains a rack and pinion shaft recessed cavity 92 with a bore 94 therethrough which functions to receive the shaft 72 releasing the clutch from engagement. A number of finger receiving and retaining slots 96 radially extend through the housing 84 and a like quantity of finger compression spring retaining cavities 98 are in linear orientation with the slots 96. These elements are pictorially illustrated in FIGS. 5 through 7 completely removed from the invention for clarity and shown in both front and rear views, as well as a cross-section.

A number of offset camming fingers 100 are pivotally disposed within the finger receiving and retaining slots 96. Each finger 100 is in a dissimilar Tee-shape consisting of a camming arm 102, a counterbalance arm 104, and a preload arm 106, depicted best in FIG. 3 completely removed from the invention for clarity. These arms are fabricated of steel and provide the camming action and linear force to centrifugally lock-in the mechanical clutch. The counterbalance arm 104 further contains a weight receiving bore 108 permitting variable weights, such as capscrews, washers, and nuts to be added therethrough to effectively alter the amount of applied force that each finger 100 transmits to the outside pressure plate 70 to pre-select the lock-up effectiveness relative to the specific vehicle and the actual track, tires, and environmental ambient conditions.

Finger retaining means, preferably in the form of a pin 110 and a pair of retaining threaded fasteners 112, maintain each finger 100 in the respective slot 96 while permitting pivotal rotation in order to utilize a centrifugal action upon the rotated elements.

A camming finger stop 114 embodied by a countersunk screw is threadably installed in the lock-up housing 84 near each slot 96 with the head of the screw obstructing the pivotal movement of the finger 100 preventing the finger from traveling over center and ceasing to apply the desired pressure from the cam action created by rotational centrifugal force. This stop 114 is illustrated best in FIG. 5 and the screws are illustrated separately in FIG. 4.

A series of camming finger compression springs 116 are disposed within the spring retaining cavities 98 of the housing 84 with a hollow plunger 118 over the spring 116. The preload arms 106 of the camming fingers 100 are in contiguous alignment with the plungers 118 and springs 116 providing a reactionary force to offset the camming action of the fingers until a predetermined rotational speed has been achieved permitting the clutch to eventually lock-in within the optimum predetermined sequence. As these springs 116 are replaceable, the force and consequently the speed at which pressure is obtained is easily changed and, therefore, completely adjustable with springs of a greater or lesser compression strength.

As previously discussed, the clutch is enclosed using the original equipment manufacturer's unmodified clutch housing cover 120, or with the addition of a spacer 122, both illustrated in FIG. 4, with the spacer 122 depicted optionally in phantom.

As previously indicated, the application of the centrifugal actuated lock-up mechanism for other vehicles is included in this invention and regardless of the type of material and configured application, the basic clutch requires an inside and outside pressure plate. While the above description is directed to a motorcycle, other dragsters simply add the same elements to the outside pressure plate making the configuration different enough to be adaptable and yet still retain the basic design. As the application is so specific to each clutch manufacturer, the present drawings, as directed to a motorcycle, must surface in other similar applications.

In operation when the desired rotational speed is obtained, each finger camming arm 102 forces the outside pressure plate 70 into tensional contact therefore compression against the nested clutch friction disks and clutch pressure plates 32, or other material, by the inward camming force of the fingers induced by rotational centrifugal force. This action causes the clutch frictional material to compress together unitedly in combination with the release of the rack and pinion shaft 72 and subsequent compression of the spring loaded outside pressure plate 70 jointly engaging and centrifugally locking-up the clutch.

Infinite adjustments may be made to achieve the desired sequence of operation, as previously described along with the force of the lock-up.

While the invention has been described in complete detail and pictorially shown in the accompanying drawings, it is not to be limited to such details, since many changes and modifications may be made in the invention without departing from the spirit and scope thereof. Hence, it is described to cover any and all modifications and forms which may come within the language and scope of the appended claims.

What is claimed is:

1. A combined mechanical and centrifugal motorcycle clutch of the type having an original equipment manufacturer's motorcycle transmission output shaft, front bearing, transmission gear cluster, main bearing assembly, center hub, plurality of nested clutch friction disks and clutch pressure plates, basket enclosure, spring loaded housing gear assembly having the main bearing assembly joined into the housing gear forming a rotational bearing receptacle, a rack and pinion shaft and a spring loaded outside pressure plate wherein the improvement comprises, a lock-up housing resiliently attached to the outside pressure plate, said lock-up housing having a rack and pinion shaft recessed cavity and bore therethrough, a plurality of finger receiving and retaining slots and a plurality of finger compression spring cavities in linear orientation with the slots, a plurality of offset camming finger pivotally disposed within the finger receiving and retaining slots, each finger having a camming arm, a counterbalance arm and a preload arm, finger retaining means rotatably holding the camming fingers within the lock-up housing slots permitting each finger camming arm to urgingly force the outside pressure plate into compression against the nested clutch friction disks and clutch pressure plates by an inward camming force of the fingers induced by rotational centrifugal force causing the clutch disks and plates to compress together combined with a release of the rack and pinion shaft with subsequent compression of the spring loaded outside pressure plate jointly locking up the clutch, and a plurality of camming finger compression springs contiguous with a selected number of preload arms on the camming fingers supplying a reactionary force to offset a camming action of the fingers until a predetermined rotational speed has been achieved permitting the clutch to eventually lock-in within a predetermined sequence and force.

2. The clutch as recited in claim 1 wherein said original equipment manufacturer's outside pressure plate further comprises a modification including a flat surface contiguous with and complimentary to said lock-up housing.

3. The clutch as recited in claim 2 further comprising a plurality of hardened steelwear pads embedded in the flat surface of the outside pressure plate contiguous with the camming arm of each finger for increasing the operational life of the clutch and to insure repeatable operational sequence.

4. The clutch as recited in claim 1 further comprising a selected number of hard chrome plated clutch pressure plates replacing the original equipment manufacturer's nested clutch pressure plates to eliminate hot spots, warpage and transmit increased torsional force through the clutch.

5. The clutch as recited in claim 1 wherein said lock-up housing further comprises a plurality of outwardly extending hollow outside pressure plate spring guide sleeves positioned between the offset camming fingers to retain the original equipment manufacturer's spring loaded outside pressure plate.

6. The clutch as recited in claim 5 wherein said spring guide sleeves further comprise a spring depressing shoulder integral with each sleeve to contiguously compress the outside pressure plate loading springs.

7. The clutch as recited in claim 1 further comprising each counterbalance arm of the camming finger further having a weight receiving bore therethrough permitting variable weight to be added through the bore effectively changing the amount of applied force that the finger transmits to the outside pressure plate to adjust the lock-up effectiveness relative to the specific motorcycle and track conditions.

8. The clutch as recited in claim 1 further comprising a camming finger stop for each camming finger preventing the finger from traveling over center and ceasing to apply pressure by cam action in conjunction with centrifugal force.

9. The clutch as recited in claim 1 wherein said finger retaining means further comprise a pin and a pair of threaded fasteners maintaining each finger rotatably within the slot.

10. The clutch as recited in claim 1 further comprising a hollow plunger disposed over each finger compression spring for contiguously engaging the preload arm of each camming finger.

11. A combined mechanical and centrifugal clutch for a motor driven vehicle comprising:

a mechanical clutch having a center hub and a spring loaded outside pressure plate with frictional material and inside pressure plates therebetween for transmitting torque therethrough when spring loaded tension is released.

a lock-up housing attached to the outside pressure plate said housing having a plurality of slots radially disposed therethrough, a plurality of offset camming fingers pivotally disposed within the slots, finger retaining means holding the camming fingers within the slots permitting each finger to force the outside pressure plate into intimate contact with the friction material and inside pressure plates by an inward camming force of the fingers induced by rotational centrifugal force causing the plates and friction material to compress together jointly locking-up the inside and outside pressure plates of the mechanical clutch when spring tension is released, and means to regulate a predetermined engagement speed of rotation and amount of compressive pressure when the camming fingers apply force to the outside pressure plate during rotation.

12. The clutch as recited in claim 11 wherein said means to regulate a predetermined engagement speed of rotation further comprise a plurality of replaceable camming finger compression springs contiguous with the fingers supplying a reactionary force to offset a camming action of the fingers until a predetermined engagement rotational speed has been achieved.

* * * * *